United States Patent
Lee et al.

(10) Patent No.: US 9,357,547 B2
(45) Date of Patent: May 31, 2016

(54) APPARATUS AND METHOD FOR PERFORMING SCANNING OF ASSIGNED SECONDARY CARRIER IN WIRELESS ACCESS SYSTEM

(75) Inventors: Eunjong Lee, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 13/820,401

(22) PCT Filed: Sep. 2, 2011

(86) PCT No.: PCT/KR2011/006512
§ 371 (c)(1),
(2), (4) Date: May 15, 2013

(87) PCT Pub. No.: WO2012/030187
PCT Pub. Date: Mar. 8, 2012

(65) Prior Publication Data
US 2013/0223321 A1    Aug. 29, 2013

Related U.S. Application Data

(60) Provisional application No. 61/380,715, filed on Sep. 8, 2010, provisional application No. 61/382,878, filed on Sep. 14, 2010, provisional application No. 61/379,736, filed on Sep. 3, 2010, provisional application No. 61/382,493, filed on Sep. 14, 2010.

(30) Foreign Application Priority Data

Jun. 17, 2011    (KR) ........................ 10-2011-0059270

(51) Int. Cl.
*H04W 4/00* (2009.01)
*H04W 72/04* (2009.01)
(Continued)

(52) U.S. Cl.
CPC ......... *H04W 72/0453* (2013.01); *H04L 5/0098* (2013.01); *H04W 24/10* (2013.01); *H04W 36/06* (2013.01)

(58) Field of Classification Search
CPC . H04W 36/06; H04W 36/18; H04W 36/0055; H04W 88/08; H04W 36/30
USPC ........................ 370/310–350; 455/432.1–444
See application file for complete search history.

(56) References Cited

U.S. PATENT DOCUMENTS 6,405,038 B1 * 6/2002 Barber et al. .................. 455/434
8,462,863 B1 * 6/2013 Zhang et al. .................. 375/260
(Continued)

FOREIGN PATENT DOCUMENTS

CN    101600245 A    12/2009
CN    101651851 A    2/2010
(Continued)

OTHER PUBLICATIONS

Eunjong Lee, et al.; LG Electronics; "Trigger condition for assigned secondary carriers (16.2.8.2.11)"; IEEE C802m-10/0490r2; Broadband Wireless Access Working Group; Jul. 8, 2010; pp. 1-8.

*Primary Examiner* — Mounir Moutaouakil
(74) *Attorney, Agent, or Firm* — Birch, Stewart, Kolasch & Birch, LLP

(57) ABSTRACT

A scan reporting method for an inactive secondary carrier in a wireless access system includes receiving, from a base station, a multicarrier advertisement (MC-ADV) message including reference carrier information, the reference carrier information indicating a carrier index of a reference carrier representing a carrier group, performing scanning of an assigned secondary carrier including at least one of an active secondary carrier and an inactive secondary carrier, and reporting, to the base station, the scan result of the inactive secondary carrier, wherein the scan result of a carrier corresponding to the lowest carrier index, of assigned secondary carriers linked to the reference carrier is reported to the base station.

20 Claims, 3 Drawing Sheets

(51) Int. Cl.
*H04L 5/00* (2006.01)
*H04W 24/10* (2009.01)
*H04W 36/06* (2009.01)

(56) References Cited

U.S. PATENT DOCUMENTS

| | | | |
|---|---|---|---|
| 2007/0042798 A1 | 2/2007 | Chen et al. | |
| 2009/0163206 A1* | 6/2009 | Adatrao et al. | 455/436 |
| 2009/0257387 A1* | 10/2009 | Gholmieh et al. | 370/329 |
| 2009/0270103 A1* | 10/2009 | Pani et al. | 455/436 |
| 2009/0316575 A1 | 12/2009 | Gholmieh et al. | |
| 2010/0061284 A1 | 3/2010 | Chen et al. | |
| 2010/0098012 A1* | 4/2010 | Bala et al. | 370/329 |
| 2010/0130137 A1 | 5/2010 | Pelletier et al. | |
| 2010/0130219 A1 | 5/2010 | Cave et al. | |
| 2010/0151857 A1* | 6/2010 | Brisebois et al. | 455/434 |
| 2010/0151858 A1* | 6/2010 | Brisebois et al. | 455/434 |
| 2011/0058543 A1* | 3/2011 | Komine et al. | 370/344 |
| 2011/0158118 A1* | 6/2011 | Chou et al. | 370/252 |
| 2011/0170519 A1* | 7/2011 | Zhang et al. | 370/331 |
| 2011/0255478 A1* | 10/2011 | Shen et al. | 370/328 |
| 2011/0255517 A1* | 10/2011 | Wang | 370/332 |
| 2012/0021792 A1* | 1/2012 | Shen et al. | 455/509 |
| 2012/0039252 A1* | 2/2012 | Damnjanovic et al. | 370/328 |
| 2012/0140638 A1* | 6/2012 | Zhao et al. | 370/241 |
| 2012/0147856 A1* | 6/2012 | Kazmi et al. | 370/332 |
| 2012/0329382 A1* | 12/2012 | Brisebois et al. | 455/1 |
| 2013/0136014 A1* | 5/2013 | Lee et al. | 370/252 |

FOREIGN PATENT DOCUMENTS

| | | |
|---|---|---|
| CN | 101668319 A | 3/2010 |
| EP | 1 641 180 A1 | 3/2006 |
| JP | 2010-154399 A | 7/2010 |
| KR | 10-2010-0029022 A | 3/2010 |
| WO | WO 2009/117944 A1 | 10/2009 |
| WO | WO 2010/008228 A2 | 1/2010 |
| WO | WO 2010/048429 A2 | 4/2010 |
| WO | WO 2010/083693 A1 | 7/2010 |

* cited by examiner (a)

(b)

(a)

(b)

APPARATUS AND METHOD FOR PERFORMING SCANNING OF ASSIGNED SECONDARY CARRIER IN WIRELESS ACCESS SYSTEM

CROSS REFERENCE TO RELATED APPLICATIONS

This application is the National Phase of PCT/KR2011/006512 filed on Sep. 2, 2011, which claims priority under 35 U.S.C. 119(e) to U.S. Provisional Application No. 61/379,736 filed on Sep. 3, 2010, U.S. Provisional Application No. 61/380,715 filed on Sep. 8, 2010, U.S. Provisional Application No. 61/382,493 filed on Sep. 14, 2010 and U.S. Provisional Application No. 61/382,878 filed on Sep. 14, 2010 and under 35 U.S.C. 119(a) to Patent Application No. 10-2011-0059270 filed in Republic of Korea on Jun. 17, 2011, all of which are hereby expressly incorporated by reference into the present application.

TECHNICAL FIELD

The present disclosure relates to a wireless access system, and more particularly, an apparatus and method for scanning of an assigned secondary carrier and reporting the scan result.

BACKGROUND ART

Hereinafter, description will be briefly given of carriers.

A user may perform modulation on the amplitude, frequency, and/or phase of a sine wave or a periodic pulse wave to include information which is desired to be transmitted. Here, the sine wave or pulse wave serving to convey information is called a carrier.

Methods for modulating a carrier include a single-carrier modulation (SCM) scheme and a multi-carrier modulation (MCM) scheme. The SCM scheme performs modulation such that all information is carried on a single carrier.

The MCM scheme divides an entire bandwidth channel of one carrier into subchannels having multiple narrow bandwidths and transmits multiple narrowband subcarriers through respective subchannels.

When using the MCM scheme, each subchannel may approximate to a flat channel due to a narrow bandwidth. A user may compensate for distortion of a channel using a simple equalizer. The MCM scheme may be implemented at a high speed using Fast Fourier Transform (FFT). Namely, the MCM scheme is favorable during high-rate data transmission as compared to the SCM scheme.

As the capabilities of a base station and/or a terminal have been developed, a frequency bandwidth which can be provided or used by the base station and/or the terminal has been enlarged. Accordingly, in the embodiments of the present invention, a multi-carrier system supporting broadband by aggregating one or more carriers is proposed.

Specifically, the multi-carrier system, which will be described hereafter, uses carriers by aggregating one or more carriers, unlike the afore-mentioned MCM scheme which uses carriers by segregating one carrier.

To efficiently use multiple bands or multiple carriers, a technique in which one medium access control (MAC) entity manages multiple carriers (e.g., multiple frequency carriers (FCs)) has been proposed.

FIGS. 1(a) and 1(b) illustrate methods for transmitting and receiving signals based on a multi-band radio frequency (RF) scheme.

In FIG. 1, one MAC layer in each of a transmitting end and a receiving end may manage multiple carriers to efficiently use the multiple carriers. To effectively transmit and receive the multiple carriers, it is assumed that both the transmitting end and the receiving end can transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIGS. 1(a) and 1(b), physical layers (PHY 0, PHY 1, . . . , PHY n−2, and PHYn−1) represent multiple bands and each of the bands may have a frequency carrier (FC) size allocated for a specific service according to a predetermined frequency policy. For example, PHY 0 (RF carrier 0) may have a frequency band size allocated for a general FM radio broadcast and PHY 1 (RF carrier 1) may have a frequency band size allocated for cellular phone communication.

Although each frequency band may have a different FA size depending on the characteristics thereof, it is assumed in the following description that each frequency carrier (FC) has a size of A MHz for convenience of explanation. Each frequency allocation (FA) band may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion.

As in the recent 3rd generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

FIG. 2 is a view illustrating an example of the use of multiple carriers in a general wireless communication system.

The multiple carriers of general technology may employ contiguous carrier aggregation as shown in FIG. 2(a) or non-contiguous carrier aggregation as shown in FIG. 2(b). The combination unit of such carriers is a basic bandwidth unit of a general legacy system (e.g., Long Term Evolution (LTE) in an LTE-advanced system or IEEE 802.16e in an IEEE 802.16m system).

In a multi-carrier environment of general technology, two types of carriers are defined as follows.

First, a first carrier (also called a primary carrier) is the carrier used by a Base Station (BS) and a Mobile Station (MS) to exchange traffic and full PHY/MAC control information. Further, the primary carrier is used for control functions for proper MS operation, such as network entry. Each MS shall have only one primary carrier per cell.

A second carrier (also called a secondary carrier) is an additional carrier which the terminal may use for traffic exchange, only per base station's specific allocation commands and rules, typically received on the primary carrier. The secondary carrier may also include control signaling to support multi-carrier operations.

In the general technology, the carriers of a multi-carrier system based on the above-described primary and secondary carriers may be classified into a fully configured carrier and a partially configured carrier.

First, the fully configured carrier is a carrier for which all control signaling actions are configured. Further, information and parameters regarding multi-carrier operations and the other carriers can also be included in the control channels.

The partially configured carrier is a carrier in which all control channels for supporting downlink (DL) transmission in a downlink carrier other than an uplink carrier, present as a pair with the downlink carrier, during Time Division Duplexing (TDD) DL transmission or in Frequency Division Duplexing (FDD) mode are configured.

Generally, a terminal may perform initial network entry through a primary carrier, and may exchange mutual multi-carrier capability information in a registration process for exchanging an Advanced Air Interface (AAI) registration request response (AAI_REG-REQ/RSP) message with a base station.

In a multicarrier system, a base station defines scanning of an assigned secondary carrier for indicating a carrier activation and a CA-specific trigger for reporting a scan result. Here, the CA-specific trigger is transmitted by being included in a multicarrier advertisement (MC-ADV) message. A terminal performs scanning of an assigned secondary carrier based upon the CA-specific trigger, and reports the scan result to the base station. The CA-specific trigger is generally defined with respect to a carrier having a smaller coverage, and applied to an assigned secondary carrier of the terminal.

Hence, when desiring to activate an assigned secondary carrier having a smaller coverage with respect to a certain (or specific) terminal, the base station can indicate (instruct) an accurate carrier activation by using the scan result of the assigned secondary carrier based upon the CA-specific trigger.

DISCLOSURE OF INVENTION

Solution to Problem

When using a CA-specific trigger, a terminal performs scanning of all of the assigned secondary carriers and reports the scan results to the base station.

However, when one of the assigned secondary carriers of the terminal is an active secondary carrier, the CA-specific trigger does not have to be applied to the active carrier. That is, in the related art, the terminal performs scanning of even the active secondary carrier of the assigned secondary carriers based upon the CA-specific trigger and reporting the scan result, which causes system overhead and performance of unnecessary operations.

Therefore, to obviate those problems, an aspect of the detailed description is not to perform scanning of an active secondary carrier of assigned secondary carriers of a terminal based upon a CA-specific trigger, and reporting of the scan result.

In addition, in case that one or more carriers with a smaller coverage belong to a base station and at least one carrier of the one or more carriers has the same coverage, even when one of the assigned carriers with the same coverage is an active carrier, the other assigned carriers having the same coverage as the active carrier are continuously scanned and the scan results are kept reported. That is, even though the base station is able to refer to channel qualities of the other assigned carriers having the same coverage as the active carrier by using the channel quality of the active carrier, the scanning based upon CA-specific trigger and the reporting of the scan result are kept performed, causing an overhead due to the unnecessary operation.

Therefore, another aspect of the present disclosure is to provide a method for terminating or stopping not only scanning of inactive secondary carriers having the same coverage as an active secondary carrier, of assigned secondary carriers of a terminal, based upon a CA-specific trigger, but also reporting of the scan result.

To achieve these and other advantages and in accordance with the purpose of the present invention, as embodied and broadly described herein, there is provided a scan reporting method for an assigned secondary carrier in a wireless access system, the method including receiving, from a base station, a multicarrier advertisement (MC-ADV) message including reference carrier information, the reference carrier information indicating a carrier index of a reference carrier representing a carrier group, performing scanning of an assigned secondary carrier including at least one of an active secondary carrier and an inactive secondary carrier, and reporting, to the base station, the scan result of the inactive secondary carrier, wherein the scan result of only a carrier corresponding to the lowest carrier index, of assigned secondary carriers linked to the reference carrier is reported to the base station.

The reporting of the scan result may be performed when the assigned secondary carriers linked to the reference carrier are all inactive secondary carriers.

The method may further include stopping scanning and/or scan reporting for the other inactive secondary carriers excluding an active secondary carrier when one of the inactive secondary carriers linked to the reference carrier is the corresponding active secondary carrier.

The multicarrier advertisement message may further include carrier activation (CA) specific trigger information, and the CA-specific trigger information may include at least one trigger condition and an action performed when the at least one trigger condition is met.

The performed action may include a transmission of a scan report (SCN-REP) message for an inactive secondary carrier.

The CA-specific trigger information may be trigger information corresponding to the reference carrier.

The scan result may be reported to the base station when the trigger condition is met.

The inactive secondary carriers linked to the reference carrier may be a subset of carriers belonging to a carrier group to which the reference carrier belongs.

The carrier group may include carriers having the same or similar properties, and the carrier properties may include a channel quality or a coverage.

The method may further include receiving a scan response (SCN-RSP) message indicating scanning of the inactive secondary carrier from the base station.

In accordance with another exemplary embodiment, this specification provides a scan reporting method for an assigned secondary carrier in a wireless access system, the method including transmitting, to a terminal, a multicarrier advertisement (MC-ADV) message including reference carrier information, the reference carrier information indicating a carrier index of a reference carrier representing a carrier group, transmitting, to the terminal, a scan response (SCN-RSP) message indicating scanning of an inactive secondary carrier of assigned secondary carriers of the terminal, and receiving, from the terminal, a scan report of a carrier corresponding to the lowest carrier index, of inactive secondary carriers linked to the reference carrier.

The method may further include measuring channel qualities of the other inactive secondary carriers excluding an active secondary carrier when one of the inactive secondary carriers linked to the reference carrier is the corresponding active secondary carrier.

The multicarrier advertisement message may further include a carrier activation (CA) specific trigger information defined for scan reporting of the inactive secondary carrier, and the CA-specific trigger information may include at least one trigger condition and an action performed when the at least one trigger condition is met.

The inactive secondary carriers linked to the reference carrier may be a subset of carriers belonging to the carrier group to which the reference carrier belongs.

In accordance with one exemplary embodiment, this specification provides a terminal for performing scan reporting of an assigned secondary carrier in a wireless access system, the terminal including a radio frequency unit configured to transmit and receive a wireless signal to and from the exterior, and a controller connected to the radio frequency unit, wherein the controller may be configured to control the radio frequency unit to receive from a base station a multicarrier advertisement (MC-ADV) message including reference carrier information indicating a carrier index of the reference carrier representing a carrier group, control the radio frequency unit to perform scanning of an inactive secondary carrier of assigned secondary carriers, and control the radio frequency unit to report the scan result of only a carrier corresponding to the lowest carrier index of inactive secondary carriers linked to the reference carrier to the base station.

The controller may control the radio frequency unit to report the scan result when assigned secondary carriers linked to the reference carrier are all inactive secondary carriers.

The controller may control the radio frequency unit to stop scanning and/or scan reporting of the other inactive secondary carriers excluding an active secondary carrier when one of the inactive secondary carriers linked to the reference carrier is the corresponding active secondary carrier.

The multicarrier advertisement message may further include a carrier activation (CA) specific trigger information defined for scan reporting of the inactive secondary carrier, and the CA-specific trigger information may include at least one trigger condition and an action performed when the at least one trigger condition is met.

The performed action may be a transmission of a scan report (SCN-REP) message for the inactive secondary carrier.

The CA-specific trigger information may be trigger information corresponding to the reference carrier.

The controller may control the radio frequency unit to report the scan result of an inactive secondary carrier corresponding to the lowest carrier index to the base station when the trigger condition is met.

Advantageous Effects of Invention

This specification may define a CA-specific trigger including a trigger condition for scan reporting only for an inactive secondary carrier, whereby unnecessary scanning and scan reporting for the inactive secondary carriers of a terminal shall not be performed, thereby reducing system overhead.

Also, this specification may use a reference carrier so as to stop or terminate scanning and scan reporting by the terminal for an inactive secondary carrier having the same coverage as an active secondary carrier, thereby reducing system overhead caused due to unnecessary operations.

MODE FOR THE INVENTION

Figure 1:
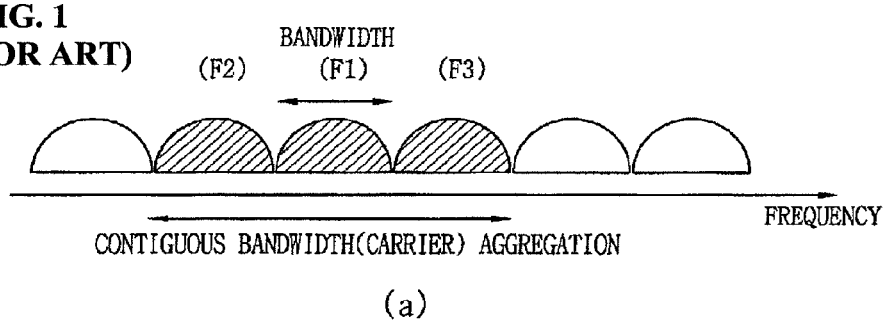
FIGS. 1A and 1B are views illustrating methods for transmitting and receiving signals based on a multi-band radio frequency (RF) scheme.
Figure 1:
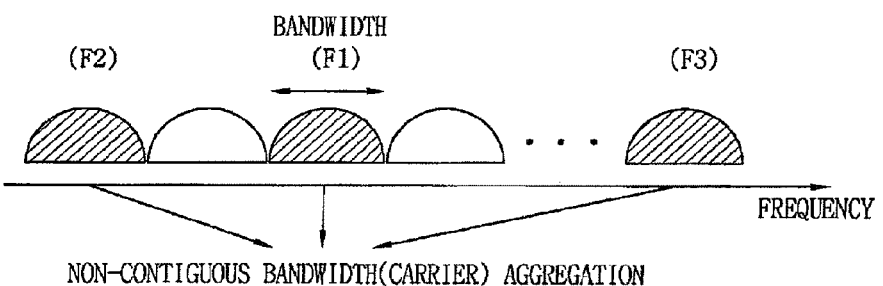
Figure 2:
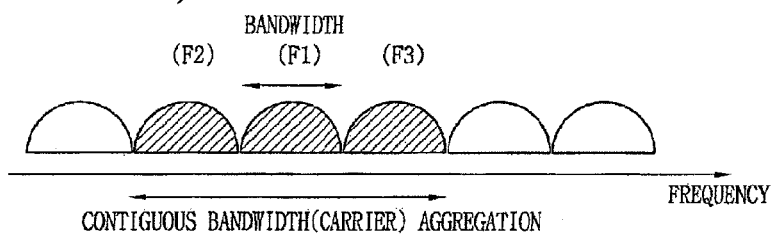
FIG. 2 is a view illustrating an example of the use of multiple carriers in a general wireless communication system.
Figure 2:
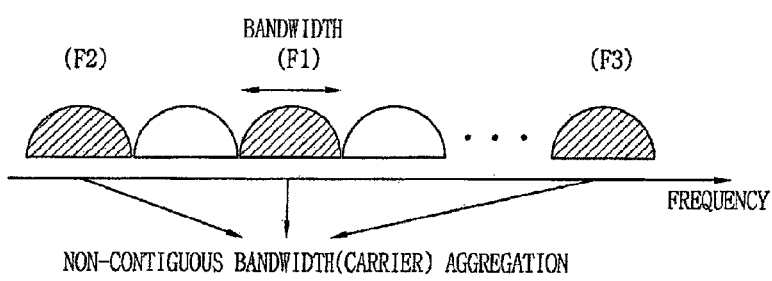

Reference will now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions of another embodiment.

In exemplary embodiments of the present invention, description is made of a data transmission and reception relationship between a base station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'advanced base station (ABS),' etc. The term 'MS' may be replaced with the term 'User Equipment (UE)', 'Subscriber Station (SS)', 'Mobile Subscriber Station (MSS)', 'mobile terminal', 'advanced mobile station (AMS),' etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Specific terms used for the exemplary embodiments of the present invention are provided to help in understanding of the present invention. These specific terms may be replaced with other terms within the scope and spirit of the present invention.

Multicarrier Operation Mode

1. Multicarrier Aggregation

Multicarrier aggregation is a multicarrier mode in which a physical layer connection of an AMS is maintained while the AMS executes data transmission via a secondary carrier, and control signaling is monitored via a primary carrier.

2. Multicarrier Switching

Multicarrier switching is a multicarrier mode in which a physical layer connection of an AMS is switched from a primary carrier to a fully configured or partially configured secondary carrier by a base station (ABS)'s instruction to receive E-MBS service via the secondary carrier.

3. Basic MC Mode

Basic Multicarrier (MC) mode is a mode in which a terminal operates with only a single carrier although it supports a primary carrier switching procedure as well as an optimized scanning of carriers related to a multicarrier operation.

Hereinafter, terms to be used in the multicarrier operation will be defined.

1. Available Carrier: The available carrier refers to all carriers belonging to the base station (ABS). The terminal may acquire information of the available carrier through an advanced air interface global carrier configuration (AAI_Global-config) message or a multicarrier advertisement (AAI_MC-ADV) message.

2. Assigned Carrier: The assigned carrier refers to a subset of an available carrier that is assigned to the AMS by the ABS. That is, the ABS may assign at least one of its own available carriers as an assigned secondary carrier of the AMS in consideration of the AMS capability.

3. Active Carrier: The active carrier refers to a carrier that is ready to perform data exchange between the AMS and the ABS, and may be a subset of the assigned carrier. Activation/deactivation of the assigned secondary carrier may be dependent upon the decision of the ABS based on a Quality of Service (QoS) request. The ABS may inform the AMS of information of whether to activate or deactivate a specific secondary carrier through a carrier management command (AAI_CM-CMD) message.

Hereinafter, based on the above mentioned description, a procedure for allowing the base station to assign a carrier to the terminal with reference to FIG. 3.

Figure 3:
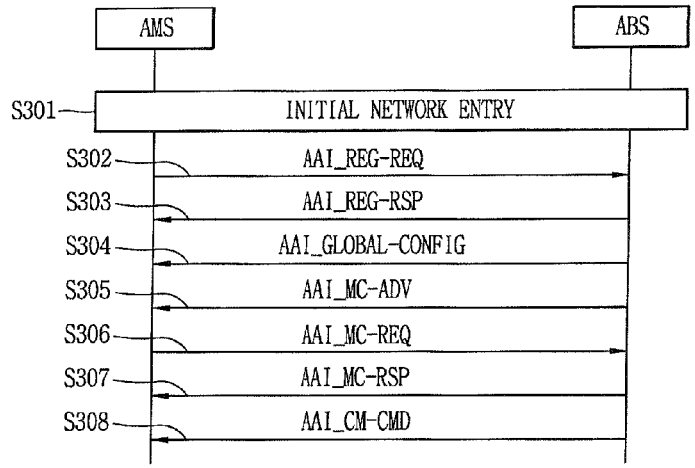
FIG. 3 is a view illustrating an exemplary procedure that a base station assigns one or more carriers to a terminal through a carrier management (operation) message (AAI_CM-CMD) in a broadband wireless access system.

FIG. 3 is a view illustrating an exemplary procedure for allowing a base station (advanced base station; ABS) to assign at least one carrier to a terminal (advanced mobile station; AMS) via a carrier management command (AAI_CM-CMD) message in a broadband wireless access system.

As illustrated in FIG. 3, the AMS may perform an initial network entry including processes, such as scanning, ranging and the like, with the ABS (S301).

The AMS and the ABS may exchange information related to multicarrier capabilities with each other via registration request/response (AAI_REG-REQ/RSP) messages (S302 and S303).

The ABS may transmit the AAI_REG-RSP message and transmit a global carrier configuration (AAI_Global-config) message (S304). The AAI_Global-config message may include information related to all the available carriers supported in a network.

Also, the AMS may acquire information related to multicarrier configuration of the ABS by receiving a multicarrier advertisement (AAI_MC-ADV) message, which is periodically broadcast from the ABS (S305).

Afterwards, the AMS may inform the ABS of information about the AMS's supportable carriers through a multicarrier request (AAI_MC-REQ) message according to multicarrier configurations of the ABS's available carriers using the acquired information, such that it can request the list of assigned carriers from the ABS (S306).

The ABS may then decide a subset, which will be assigned as the AMS's secondary carrier, from among the ABS's available carriers on the basis of information received from the AMS, decide the list of assigned carriers, and inform the AMS of the decided list of assigned carriers through a multicarrier response (AAI_MC-RSP) message (S307).

Thereafter, the ABS may transmit a carrier management command (AAI_CM-CMD) message to the AMS according to the decision based on the QoS request, such that it determines whether to activate or deactivate the assigned carrier given to the AMS (S308).

Hereinafter, description will be given of a method of stopping scanning and scan reporting with respect to an active secondary carrier of assigned secondary carriers belonging to a terminal by defining carrier activation (CA)-specific trigger information (or field) only for inactive assigned secondary carriers, and a method for stopping scanning and scan reporting, based upon CA-specific trigger information, with respect to inactive secondary carriers having the same or similar carrier properties to an active secondary carrier, in accordance with various exemplary embodiments.

First Exemplary Embodiment

The first exemplary embodiment illustrates a method for newly defining CA-specific trigger information to be applied only for inactive secondary carriers of assigned secondary carriers of a terminal.

Figure 4:
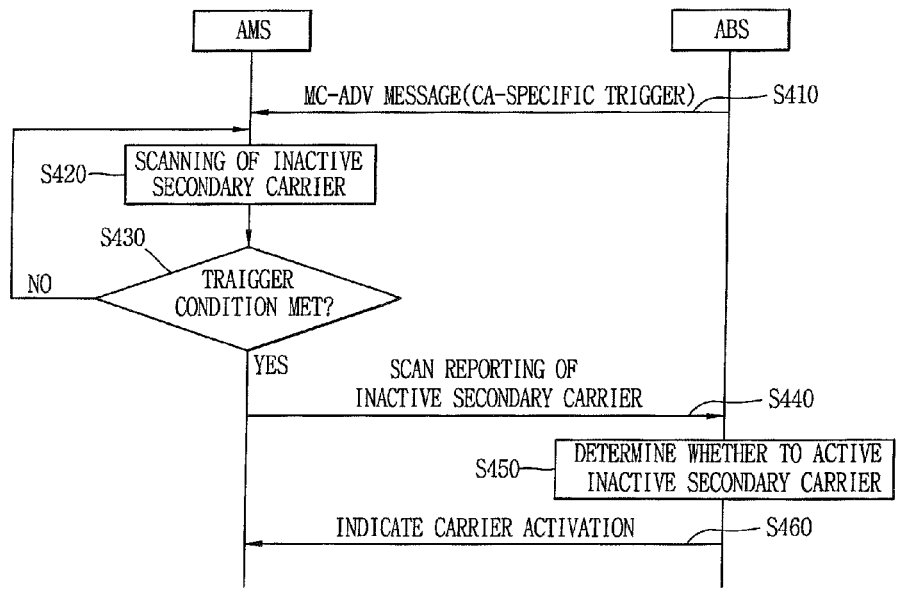
FIG. 4 is a flowchart in accordance with a first exemplary embodiment of this specification.

FIG. 4 is a flowchart in accordance with a first exemplary embodiment of this specification.

As illustrated in FIG. 4, the ABS may transmit a multicarrier advertisement (AAI_MC-ADV) message, which includes a CA-specific trigger field defined in the following Table 1, to the AMS (S410).

Here, the CA-specific trigger field refers to a trigger field defined to report a scan result of an inactive secondary carrier, and may include at least one trigger condition and an action performed when the trigger condition is met. The trigger condition indicates a trigger condition for scan reporting of an inactive secondary carrier, and the performed action indicates a scan result reporting, namely, a transmission of a scan report (AAI_SCN-REP) message to the ABS.

Afterwards, the AMS may perform scanning of an inactive secondary carrier of the assigned secondary carriers (S420). Here, the scanning of the inactive secondary carrier may be performed when meeting the trigger condition for scanning or receiving a scan response (SCN-RSP) message from the ABS. The trigger condition for scan reporting may equally be used as the trigger condition for scanning.

When the scan result for the inactive secondary carrier meets the trigger condition included in the CA-specific trigger field defined in Table 1 (S430), the AMS may report the scan result to the ABS (S440). Here, the AMS may report the scan result to the ABS through a scan report (SCN-REP) message.

Afterwards, the ABS determines whether to activate the inactive secondary carrier based upon the scan result of the inactive secondary carrier reported from the AMS, and instruct the AMS to activate the inactive secondary carrier (S450, S460).

Table 1 shows an exemplary format of the CA-specific trigger field in accordance with the first exemplary embodiment.

TABLE 1

| Name | Length (bits) | Value |
| --- | --- | --- |
| Number of conditions | 2 | The number of conditions that are included in this trigger (see loop definition below). When more than one condition is included, this trigger is referred to as a complex trigger and is the logical AND combination of all the included conditions. |
| for(i=0; i<= Number of conditions; i++){ | | |
| Type/Function/Action | 3 | See Table 2 or description |
| Trigger value | 8 | Trigger value is the value used in comparing measured metric for determining a trigger condition. |
| Trigger averaging parameter | 4 | The averaging parameter used for averaging this trigger metric. If not present, the default trigger averaging parameter in AAI-SCD is used. 0x0: 10x1: 1/20x2: 1/40x3: 1/8 0x4: 1/16 0x5: 1/32 0x6: 1/64 0x7: 1/128 0x8: 1/256 0x9: 1/512 0xA to 0xF: reserved |
| } | | |

Table 2 shows an exemplary Type/Function/Action format of the CA-specific trigger field in accordance with the first exemplary embodiment.

TABLE 2

| Name | Size (bits) | Value | Description |
| --- | --- | --- | --- |
| Type | 1(MSB) | Trigger metric type: 0x0: CINR metric 0x1: RSSI metric | |
| Function | 1 | Computation defining scanning and reporting trigger condition: 0x0: Metric of inactive assigned secondary carrier is greater than absolute value | |
| Action | 1(LSB) | Action performed upon reaching trigger condition: 0b0: Respond on trigger with AAI_SCN-REP | Action 0b0 applies to only Function 0x0, and action 0b1 applies to only Function 0x1. |

Referring to Table 2, the CA-specific trigger fields may include a trigger type field, a trigger function field for defining a computation method for triggering a specific action, and an action field performed when the trigger condition is met.

As shown in Table 2, the trigger type field may include a Carrier to Interference and Noise Ration (CINR), and a Received Signal Strength Indicator: RSSI).

Also, the trigger function field may indicate a computation method for triggering scanning and scan reporting. When a metric of an inactive assigned secondary carrier is greater than an absolute value, the scanning and the scan reporting may be triggered.

When the trigger action field is set to '0b0,' for example, it may indicate a transmission of a scan report (SCN-REP) message to the ABS when reaching the trigger condition.

Second Exemplary Embodiment

The second exemplary embodiment illustrates a method for reporting a scan result with respect to an inactive secondary carrier using reference carrier information (or field) transmitted via a multicarrier advertisement (AAI_MC-ADV) message.

That is, in the second exemplary embodiment, when there are a predefined CA-specific trigger condition with respect to a certain (or specific) carrier (for example, reference carrier) and at least one carrier having a trigger condition which is the same as the predefined CA-specific trigger condition, a reference carrier index, by which the terminal is informed of a carrier index (for example, defined only in a carrier having the lowest index) corresponding to the predefined CA-specific trigger condition through a multicarrier advertisement message.

Figure 5:
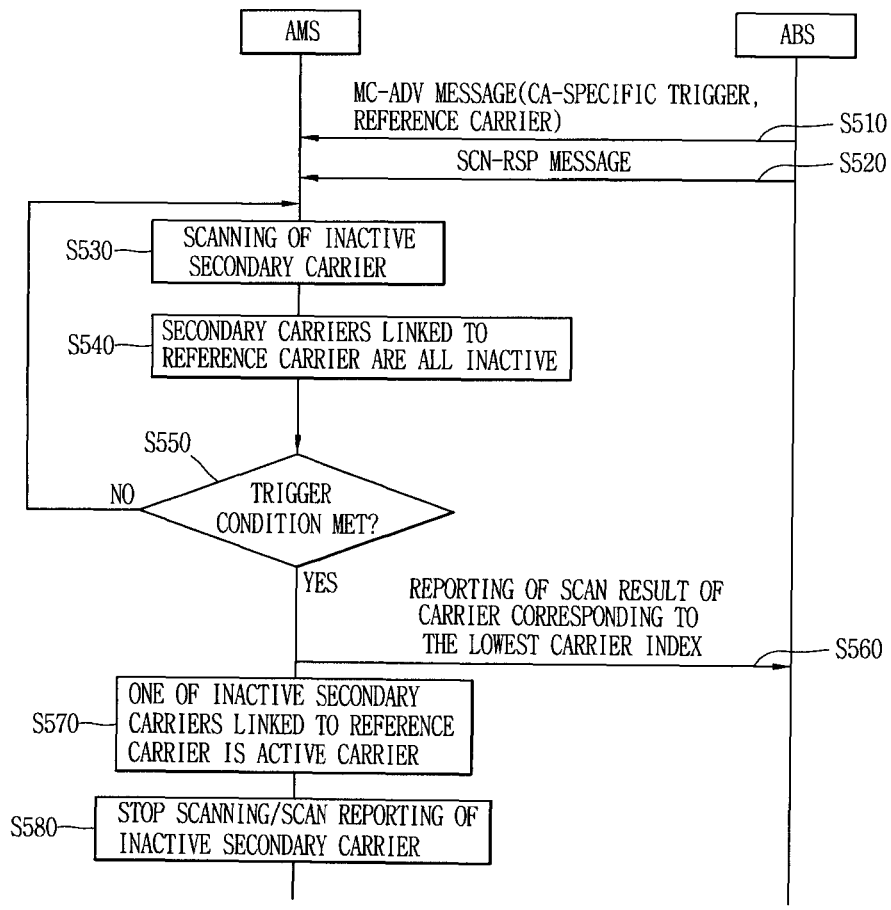
FIG. 5 is a flowchart in accordance with a second exemplary embodiment of this specification.

FIG. 5 is a flowchart in accordance with a second exemplary embodiment of this specification.

As illustrated in FIG. 5, the AMS may receive a multicarrier advertisement (MC-ADV) message including reference carrier information from the ABS (S510). Here, the reference carrier information may indicate an index of a carrier acting as a reference carrier, which represents a carrier group, and indicate a carrier used for CA-specific trigger.

The reference carrier index may indicate a physical carrier index.

Also, the multicarrier advertisement message may include a CA-specific trigger field. The CA-specific trigger field is trigger information defined for scanning and/or scan reporting of an inactive secondary carrier. The CA-specific trigger field may exist only for the reference carrier. Here, carriers linked to the reference carrier may equally use the CA-specific trigger field existing for the reference carrier. That is, CA-specific trigger information related to the carriers linked to the reference carrier can be omitted.

The AMS may perform a scan reporting for the inactive secondary carrier based upon the CA-specific trigger field corresponding to the reference carrier.

Here, the CA-specific trigger field, as shown in Table 1, may include at least one trigger condition and an action performed upon reaching the trigger condition.

The AMS may equally use the CA-specific trigger field corresponding to the reference carrier, with respect to an assigned secondary carrier linked to the reference carrier.

That is, when the ABS transmits the reference carrier information to the AMS via the multicarrier advertisement message, the ABS may not transmit the CA-specific trigger condition for each inactive secondary carrier, but transmit the CA-specific trigger condition corresponding to the reference carrier with respect to the inactive secondary carriers linked to the reference carrier.

As one example, when a reference carrier is 'Carrier 1' and inactive secondary carriers linked to the reference carrier are 'Carrier 2' and 'Carrier 3,' the ABS may not separately transmit a CA-specific trigger condition for each of 'Carrier 2' and 'Carrier 3' but transmit a CA-specific trigger condition corresponding to 'Carrier 1' to the AMS.

Afterwards, the AMS may receive a scan response (SCN-RSP) message, which indicates scanning of an inactive secondary carrier of the assigned secondary carriers, from the ABS (S520). That is, the AMS may perform scanning of the inactive secondary carrier (S530) when receiving the SCN-RSP message from the ABS.

Here, the AMS may check whether the assigned secondary carrier linked to the reference carrier, which is received via the multicarrier advertisement message, is an active carrier.

The assigned secondary carriers linked to the reference carrier refer to carriers corresponding to a subset of carriers within a carrier group, to which the reference carrier belongs. As one example, a specific carrier group includes 'Carrier 1,' 'Carrier 2,' 'Carrier 3' and 'Carrier 4.' 'Carrier 1' is a reference carrier, which is representative of the specific carrier group. When assigned carriers of the AMS are 'Carrier 2' and 'Carrier 3,' the assigned carriers linked to the reference carrier are 'Carrier 1' refer to 'Carrier 2' and 'Carrier 3.'

When it is checked that the assigned secondary carriers linked to the reference carrier are all inactive secondary carriers (S540), the AMS may perform reporting of the scan result, to the ABS, only with respect to a secondary carrier corresponding to the lowest carrier index of all of the assigned secondary carriers linked to the reference carrier. Here, the AMS may also perform scanning only for a secondary carrier corresponding to the lowest carrier index.

Here, when the scan result meets the trigger condition of the CA-specific trigger field included in the multicarrier advertisement message (S550), the AMS may report the scan result to the ABS (S560). The scan result may be transmitted to the ABS via a scan report (SCN-REP) message.

Hence, the ABS may determine whether the inactive secondary carrier is changed to an active carrier based upon the scan result transmitted from the AMS.

When one of the assigned secondary carriers linked to the reference carrier is an active secondary carrier (S570), the AMS may terminate (stop) scanning and scan reporting with respect to the other inactive secondary carriers (S580). That is, in this case, the ABS may refer to channel qualities of the other inactive secondary carriers based upon channel quality of the active secondary carrier. Consequently, the ABS may indicate to activate the inactive secondary carrier by the active secondary carrier.

The following Table 3 shows an exemplary format of the multicarrier advertisement (MC-ADV) message including a reference carrier field and a CA-specific trigger field.

TABLE 3

| Field | Size (bits) | Description | Conditions |
|---|---|---|---|
| Reference carrier | 6 | Indicates the physical carrier index of the carrier that works as a reference carrier representing a group of carriers with a similar property and used for the CA-specific trigger. The group of carriers represented by the Reference Carrier use the same CA-specific Trigger definitions as this reference carrier. If this value is present, CA-specific Trigger definitions for the corresponding carrier shall be omitted. | Optional Present for the carriers that belong to the carrier group represented by the Reference Carrier. Shall be omitted for the physical carrier index that is the Reference Carrier. |
| CA-specific Trigger definitions | Variable | Carrier Activation-specific triggers with encoding defined in Table 1 CA-specific Trigger description. | Optional Present for the Reference Carrier when the corresponding carrier is required to be scanned for carrier activation. Shall be present only for the Reference Carrier. (that is, inclusion of this parameter is mutually exclusive with the parameter of Reference Carrier.) |
| PCC-specific Trigger definitions | Variable | Primary Carrier Change-specific triggers with encoding defined in trigger description. | Optional Present when the corresponding carrier is required to apply different trigger condition from definitions of AAI_SCD message. |

Referring to Table 3, the MC-ADV message may include the reference carrier field and the CA-specific trigger definitions field.

The reference carrier field may represent a group of carriers having similar properties, and indicate a physical carrier index of a carrier working as a reference carrier used for CA-specific trigger. When the reference carrier field value is present, CA-specific trigger definitions for carriers within the group of carriers shall be omitted.

The CA-specific trigger field may include a trigger type field, a trigger function field and a trigger action field, as defined in the following Table 4. The CA-specific trigger field may be present only for a reference carrier when scanning is required for activation of an assigned secondary carrier.

The following Table 4 shows an example of Type/Function/Action format of the CA-specific trigger field in accordance with the second exemplary embodiment.

TABLE 4

| Name | Size (bits) | Value | Description |
|---|---|---|---|
| Type | 1(MSB) | Trigger metric type: 0x0: CINR metric 0x1: RSSI metric | |
| Function | 1 | Computation defining scanning and reporting trigger condition: 0x0: Metric of inactive assigned secondary carrier is greater than absolute value0x0: Metric of active assigned secondary carrier is less than absolute value | |
| Action | 1(LSB) | Action performed upon reaching trigger condition: 0b0: Respond on trigger with AAI_SCN-REP for inactive secondary carrier 0b1: reserved | Action 0b0 applies to only Function 0x0, and action 0b1 applies to only Function 0x1. |

Third Exemplary Embodiment

The third exemplary embodiment illustrates scan reporting of inactive secondary carriers having the same coverage, by defining a CA-specific trigger condition for all of the carriers, for which the CA-specific trigger condition is to be defined, and considering a carrier having the same CA-specific trigger condition as a carrier having the same coverage.

The AMS may receive, from the ABS, a multicarrier advertisement message including a CA-specific trigger field defined for scanning and scan reporting of an inactive secondary carrier. Here, the CA-specific trigger field may include definitions of trigger condition for each of the inactive secondary carriers.

Afterwards, the AMS may receive a scan response message, which indicates performing of scanning of the inactive secondary carrier, from the ABS. Here, the AMS may alternatively perform scanning when reaching a trigger condition with reference to the CA-specific trigger field, without reception of the scan response message.

The AMS may perform scanning of the inactive secondary carrier. When meeting the trigger condition of the CA-specific trigger field, the AMS may report the scan result to the ABS. Here, if one of the assigned carriers having the same trigger condition defined is an active carrier, the AMS may stop scanning and scan reporting of the inactive secondary carrier having the same trigger condition as the active secondary carrier.

Hence, the ABS may refer to channel quality of the inactive secondary carrier having the same coverage (or the same trigger condition) as the active secondary carrier based upon the channel quality of the active secondary carrier to indicate activation of the inactive secondary carrier.

Fourth Exemplary Embodiment

The fourth exemplary embodiment illustrates scanning and scan reporting of an inactive secondary carrier by defining one trigger condition for carriers belonging to the same carrier group.

Here, carriers belonging to the same carrier group have the same coverage. The ABS transmits to the AMS information related to every available carriers supported in a network through a global (or configuration) message (AAI_Global-CFG message). In order to efficiently transmit the available carriers related information to the AMS, the concept of carrier group is used, and the same carrier group is defined as a group of consecutive carriers that subcarriers are sorted by a specific frequency offset. Therefore, the carriers belonging to the same carrier group may be considered as a set of carriers having same or similar properties.

The AMS may receive a CA-specific trigger field defined for scanning and scan reporting of an inactive secondary carrier from the ABS. The CA-specific trigger field may be transmitted via a multicarrier advertisement message.

The CA-specific trigger field may be defined for each carrier group, and carriers belonging to one carrier group may have the same trigger condition. As one example, when N carries belong to one carrier group, all of the N carriers belonging to the same carrier group have the same trigger condition.

Afterwards, the AMS may perform scanning and scan reporting of only one carrier, with respect to the secondary carriers belonging to the carrier group, of the assigned secondary carriers, based upon the trigger condition.

Here, when one carrier belonging to the carrier group, of the assigned secondary carriers, is an active carrier, scanning and scan reporting of the carriers belonging to the carrier group, to which the active carrier belongs, may not be performed. That is, the ABS may indicate a carrier activation by referring to channel qualities of the other inactive secondary carriers belonging to the carrier group based upon a channel quality indicator (CQI) of the active secondary carrier.

Figure 6:
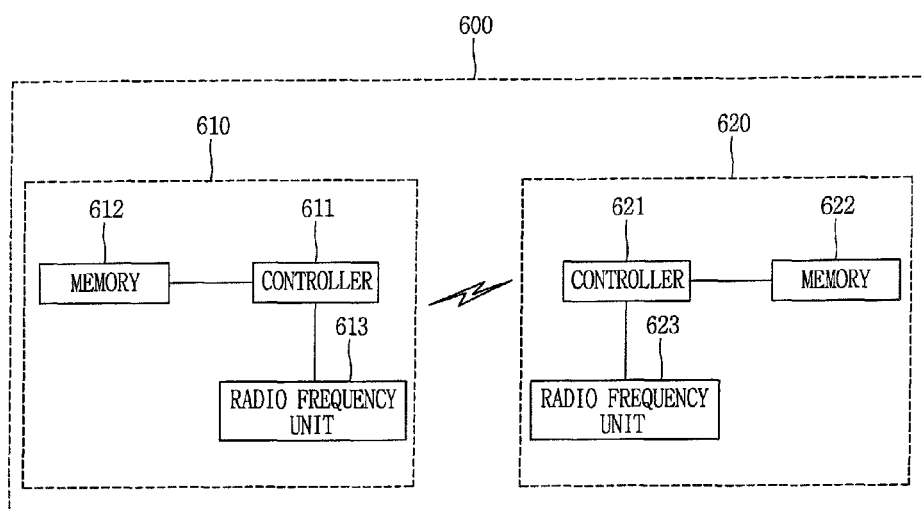
FIG. 6 is a block diagram illustrating a wireless communication system in accordance with one exemplary embodiment of this specification.

FIG. 6 is a block diagram illustrating a wireless communication system in accordance with one exemplary embodiment of this specification.

A base station (ABS) 610 may include a controller 611, a memory 612 and a radio frequency (RF) unit 613.

The controller 611 may implement the proposed function, process and/or method. Wireless interface protocol layers may be implemented by the controller 611.

The controller 611 may be configured to transmit a message (as one example, multicarrier advertisement (MC-ADV) message), which includes a scan reporting trigger condition of an inactive secondary carrier, to a terminal (AMS) when determined to activate the inactive secondary carrier.

The memory 612 may be connected to the controller 611 to store protocols or parameters for the scan reporting trigger condition of the inactive secondary carrier. The RF unit 613 may be connected to the controller 611 to transmit and/or receive wireless signals.

A terminal (AMS) 620 may include a controller 621, a memory 622 and an RF unit 623.

The controller 621 may implement e proposed function, process and/or method. Wireless interface protocol layers may be implemented by the controller 621. The controller 621 may be configured to transmit scan result to the base station through a scan report message when the scan result meets a scan reporting trigger condition of an inactive secondary carrier.

The memory 612 may be connected to the controller 621 to store protocols or parameters for the scan reporting of the inactive secondary carrier. The RF unit 623 may be connected to the controller 621 to transmit and/or receive wireless signals.

The controller 611, 621 may include an application-specific integrated circuit (ASIC), other chipset, logical circuit and/or data processor. The memory 612, 622 may include a read-only memory (ROM), a random access memory (RAM), a flash memory, a memory card, a storage medium and/or other storage device. The RF unit 613, 623 may include a baseband circuit for processing wireless signals. With a software configuration, the aforesaid mechanism may be implemented by a module (process, functionality, etc.) for performing the functions. The module may be stored in the memory 612, 622 and executed by the controller 611, 621. The memory 612, 622 may be present inside or outside the controller 611, 621, or connected to the controller 611, 621 via a variety of well-known elements.

The invention claimed is:

1. A scan reporting method for secondary carrier activation in a wireless access system capable of concurrent use of multiple carriers comprising a primary carrier and at least one secondary carrier, the method comprising:
 receiving, from a base station through the primary carrier, a multicarrier advertisement (MC-ADV) message including reference carrier information, the reference carrier information indicating an index of carrier that works as a reference carrier representing a carrier group;
 performing the scanning for at least one inactive secondary carrier among the at least one secondary carrier; and
 reporting, to the base station, a scan result for the at least one inactive secondary carrier,
 wherein the scan result reporting is performed only for an inactive secondary carrier corresponding to the lowest carrier index of assigned secondary carriers linked to the reference carrier when the assigned secondary carriers linked to the reference carrier are all inactive.

2. The method of claim 1, further comprising stopping scanning and/or scan reporting for the remaining inactive secondary carriers excluding an active secondary carrier when one of the inactive assigned secondary carriers linked to the reference carrier is activated.

3. The method of claim 1, wherein the multicarrier advertisement message further comprises carrier activation (CA) specific trigger information, the CA-specific trigger information including at least one trigger condition and an action performed when the at least one trigger condition is met.

4. The method of claim 3, wherein the performed action comprises a transmission of a scan report (SCN-REP) message for an inactive secondary carrier.

5. The method of claim 3, wherein the CA-specific trigger information is trigger information corresponding to the reference carrier.

6. The method of claim 5, wherein the scan result is reported to the base station when the trigger condition is met.

7. The method of claim 1, wherein the inactive secondary carriers linked to the reference carrier are a subset of carriers belonging to the carrier group to which the reference carrier belongs.

8. The method of claim 1, wherein the carrier group comprises carriers having the same or similar properties, and the carrier properties are a channel quality or a coverage.

9. The method of claim 1, further comprising receiving, from the base station, a scan response (SCN-RSP) message indicating scanning of the inactive secondary carrier.

10. A scan reporting method for secondary carrier activation in a wireless access system capable of concurrent use of multiple carriers comprising a primary carrier and at least one secondary carrier, the method comprising:
 transmitting, to a terminal through the primary carrier, a multicarrier advertisement (MC-ADV) message including reference carrier information, the reference carrier information indicating an index of carrier that works as a reference carrier representing a carrier group;
 transmitting, to the terminal, a scan response (SCN-RSP) message indicating scanning of an inactive secondary carrier of assigned secondary carriers of the terminal; and
 receiving, from the terminal, a scan report of an inactive secondary carrier among the at least one secondary carrier,
 wherein the scan report is only for an inactive secondary carrier corresponding to the lowest carrier index of inactive secondary carriers linked to the reference carrier, when the secondary carriers linked to the reference carrier are all inactive.

11. The method of claim 10, further comprising measuring channel qualities of the remaining inactive secondary carriers through an active secondary carrier when one of the inactive secondary carriers linked to the reference carrier is activated.

12. The method of claim 10, wherein the multicarrier advertisement message further comprises a carrier activation (CA) specific trigger information defined for scan reporting of the inactive secondary carrier,
 wherein the CA-specific trigger information comprises at least one trigger condition and an action performed when the at least one trigger condition is met.

13. The method of claim 10, wherein the inactive secondary carriers linked to the reference carrier are a subset of carriers belonging to the carrier group to which the reference carrier belongs.

14. A terminal for performing scan reporting for secondary carrier activation in a wireless access system capable of concurrent use of multiple carriers comprising a primary carrier and at least one secondary carrier, the terminal comprising:
 a radio frequency unit configured to transmit and receive a wireless signal to and from the exterior; and
 a controller connected to the radio frequency unit,
 wherein the controller is configured to control the radio frequency unit to receive from a base station a multicarrier advertisement (MC-ADV) message including reference carrier information indicating an index of carrier that works as a reference carrier representing a carrier group through the primary carrier, control the radio frequency unit to perform scanning for at least one inactive secondary carrier among the at least one secondary carrier, and control the radio frequency unit to report, to the base station, the scan result only for an inactive secondary carrier corresponding to the lowest carrier index of assigned secondary carriers linked to the reference carrier when the assigned secondary carriers linked to the reference carrier are all inactive.

15. The terminal of claim 14, wherein the controller controls the radio frequency unit to stop scanning and/or scan reporting for the remaining inactive secondary carriers excluding an active secondary carrier when one of the inactive secondary carriers linked to the reference carrier is activated.

16. The terminal of claim 14, wherein the multicarrier advertisement message further comprises a carrier activation (CA) specific trigger information defined for scan reporting of the inactive secondary carrier,
 wherein the CA-specific trigger information comprises at least one trigger condition and an action performed when the at least one trigger condition is met.

17. The terminal of claim 16, wherein the performed action is a transmission of a scan report (SCN-REP) message for the inactive secondary carrier.

18. The terminal of claim 16, wherein the CA-specific trigger information is trigger information corresponding to the reference carrier.

19. The terminal of claim 18, wherein the controller controls the radio frequency unit to report, to the base station, the scan result for the inactive secondary carrier corresponding to the lowest carrier index when the trigger condition is met.

20. The method of claim 1, wherein the multicarrier advertisement message further comprises carrier activation (CA) specific trigger information, the CA-specific trigger information including a first trigger condition for the reference carrier, and second and third trigger conditions for second and third inactive secondary carriers among the at least one inactive secondary carrier, respectively, and wherein the base station does not separately transmit the second and third trigger conditions but separately transmits the first trigger condition to a mobile station.

* * * * *